(12) United States Patent
Cattani et al.

(10) Patent No.: US 9,121,363 B2
(45) Date of Patent: Sep. 1, 2015

(54) FUEL INJECTION PATTERN AND TIMING

(71) Applicant: International Engine Intellectual Property Company, LLC, Lisle, IL (US)

(72) Inventors: Luis Carlos Cattani, Aurora, IL (US); Michael Uchanski, Chicago, IL (US); Rogelio Rodiguez, Plainfield, IL (US); Jer Shen Jason Chen, Naperville, IL (US); Dileep Khadilkar, Naperville, IL (US); Rahul Dev Rajampeta, Elmhurst, IL (US); Jeremy Grant Schipper, Chicago, IL (US); Eric Kastanis, Chicago, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 365 days.

(21) Appl. No.: 13/629,301

(22) Filed: Sep. 27, 2012

(65) Prior Publication Data

US 2013/0166178 A1 Jun. 27, 2013

Related U.S. Application Data

(60) Provisional application No. 61/539,766, filed on Sep. 27, 2011.

(51) Int. Cl.
| | |
|---|---|
| *F02D 41/30* | (2006.01) |
| *F02D 41/10* | (2006.01) |
| *F02D 41/40* | (2006.01) |
| *F02D 35/02* | (2006.01) |

(52) U.S. Cl.
CPC .............. *F02D 41/30* (2013.01); *F02D 41/10* (2013.01); *F02D 41/401* (2013.01); *F02D 41/403* (2013.01); *F02D 35/028* (2013.01); *F02D 2250/38* (2013.01); *Y02T 10/44* (2013.01)

(58) Field of Classification Search
CPC ............ F02D 31/0002; F02D 41/0025; F02D 41/0082; F02D 41/1454; F02D 41/029; F02D 41/30; Y02T 10/26; Y02T 10/44
USPC .......... 701/103–105; 123/299, 300, 305, 443, 123/478
See application file for complete search history.

(56) References Cited

U.S. PATENT DOCUMENTS

| | | | | |
|---|---|---|---|---|
| 4,467,759 | A * | 8/1984 | Artman | 123/263 |
| 5,768,887 | A * | 6/1998 | Nakamura et al. | 60/274 |
| 5,771,867 | A * | 6/1998 | Amstutz et al. | 123/568.21 |
| 6,386,176 | B1 * | 5/2002 | McGee | 123/299 |
| 6,988,029 | B1 | 1/2006 | Kennedy | |
| 6,990,951 | B1 | 1/2006 | Liu | |

(Continued)

*Primary Examiner* — John Kwon
*Assistant Examiner* — Johnny H Hoang
(74) *Attorney, Agent, or Firm* — Mark C. Bach; Jeffrey P. Calfa (57) ABSTRACT

A method is provided for operating an engine to limit soot emissions during fuel-enriched operation. The method includes operating the engine using a first fuel injection pattern and timing to inject fuel into a combustion chamber of the engine. The method further includes receiving a request for an increased engine power output and operating the engine using a second fuel injection pattern and timing to inject more fuel into the combustion in response to the request for the increased power output, where the second fuel injection pattern and timing is configured to minimize soot emissions during enriched fuel operations, such as during transient operations.

16 Claims, 10 Drawing Sheets

(56) References Cited

U.S. PATENT DOCUMENTS

| | | | |
|---|---|---|---|
| 7,360,522 B2 * | 4/2008 | Tamma et al. | 123/299 |
| 8,812,217 B2 * | 8/2014 | Hashizume | 701/105 |
| 2004/0069281 A1 | 4/2004 | Corba | |
| 2005/0205052 A1 * | 9/2005 | Blessing et al. | 123/299 |
| 2006/0042586 A1 * | 3/2006 | Hutmacher et al. | 123/276 |
| 2007/0089401 A1 * | 4/2007 | Nieuwstadt et al. | 60/285 |
| 2011/0072788 A1 * | 3/2011 | Ruona et al. | 60/276 |
| 2011/0072794 A1 * | 3/2011 | Van Nieuwstadt et al. | 60/285 |

\* cited by examiner

FUEL INJECTION PATTERN AND TIMING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

FIELD

This disclosure relates to the operation of an internal combustion engine. Aspects and embodiments of the presently described technology relate to operation during transient power operation of the engine.

BACKGROUND

Increasing fuel efficiency of internal combustion engines and limiting their emission of undesirable combustion products are studied objects of engine control. Fuel efficiency is increased by limiting the amount of fuel provided to the engine during engine operation at constant or slowly changing engine speed under low engine loads. Providing a limited amount of fuel to the engine creates a mixture of air and fuel that contains more air than is required for combustion of the fuel. Such mixtures are referred to as a "lean mixture." Combustion of lean air and fuel mixtures by an internal combustion engine, however, creates high combustion temperatures that result in formation of undesirable nitrogen and oxygen compounds, i.e., NOx pollutants.

When greater power is required from an internal combustion engine, either at constant engine speed, or more commonly, during operation to accelerate a vehicle, more fuel must be consumed to provide the required power. Meeting a demand for a quick increase in power output may require different fueling of the engine than during prolonged low power operation. For example, an enriched air/fuel that is at or near a stoichiometric air/fuel ratio may be delivered to the engine to increase the engine's power output. While the amount of NOx emissions may actually decrease with enriched air/fuel ratios, particulate emissions, e.g., soot, tend to increase during enriched air/fuel ratios.

Different fuel injection strategies, including the pattern and timing of fuel injections to an engine's combustion chambers, can be provided depending on the particular operating conditions an engine is experiencing. For example, one fuel injection strategy may be used when the engine is operating in a "steady state" condition, while a different strategy may be adopted during transient operations where engine power is increasing. By tailoring the fuel injection strategy to the engine operating condition, it is possible to address factors including fuel economy and pollution control, while still providing acceptable engine performance.

BRIEF SUMMARY

Aspects and embodiments of the present technology described herein relate to one or more systems and methods for controlling the operation of an engine. According to at least one aspect of the present technology, at least one method is provided for operating an engine to limit soot emissions during fuel enriched engine operation. The method includes operating the engine using a first fuel injection pattern and timing to inject fuel into a combustion chamber of the engine. The method further includes receiving a request for an increased engine power output and operating the engine using a second fuel injection pattern and timing to inject more fuel into the combustion in response to the request for the increased power output. In at least one embodiment, the second fuel injection pattern and timing is configured to minimize soot emissions during enriched fuel operations, such as during transient operations.

According to certain aspects of the present technology, the first fuel injection pattern and timing may be configured to reduce NOx emissions during lean operation, such as during steady state engine operation. In at least one embodiment, the first fuel injection pattern may include at least one pilot injection and at least one main injection. According to at least one embodiment, the pilot injection begins when a piston is between about 15 degrees and about −5 degrees before top dead center of a combustion stroke, while the main injection of the first fuel injection pattern may begin when the piston is between about 0 degrees and about −10 degrees before top dead center of a combustion stroke.

According to a further aspect of the present technology, the second fuel injection pattern and timing may be a main only injection. According to at least one embodiment, the main injection of the second fuel injection pattern may begin when the piston is between about 15 degrees and about −10 degrees before top dead center of a combustion stroke.

According to further aspects of the present technology, the method may be used for engines that operate using diesel fuel, natural gas, hydrocarbon fuels, hydrocarbon fuel blends, hydrocarbon and biofuel blends, methane, ethanol, gasoline, biofuel, combinations thereof, and derivatives thereof.

According to another aspect of the present technology, the method may include operating the engine at a first power output by providing a substantially lean air/fuel condition in a combustion chamber of the engine. Providing the substantially lean air/fuel condition may include injecting fuel into the combustion chamber using a first fuel injection pattern and timing that is selected to reduce NOx emissions during lean air/fuel conditions. In response to a request for second, increased power output from the engine, the method may include providing a substantially enriched air/fuel condition in the combustion chamber of the engine to transition the engine to the second power output. Providing the substantially enriched air/fuel condition may include injecting fuel into the combustion chamber using a second fuel injection pattern and timing that is selected to reduce soot emissions during the enriched air/fuel condition.

According to another aspect of one or more methods of the present technology, the engine is diesel fueled and the substantially lean air/fuel condition may have an air/fuel ratio ranging from about 16:1 to about 20:1, while the substantially rich air/fuel condition may have an air/fuel ratio ranging from about 12:1 to about 15:1.

DESCRIPTION OF EMBODIMENTS

Aspects and embodiments of the present technology described herein concern control of an internal combustion engine. In particular, some aspects and embodiments concern control of an internal combustion engine to limit emission of undesirable combustion products. Other aspects and embodiments concern improving transient response of an internal combustion engine to requests for increased power while limiting or reducing emission of undesirable combustion products (e.g., soot).

Various examples of embodiments of the present technology will be described more fully hereinafter with reference to the accompanying drawings, in which such examples of embodiments are shown. Like reference numbers refer to like elements throughout. Other embodiments of the presently described technology may, however, be in many different forms and are not limited solely to the embodiments set forth herein. Rather, these embodiments are examples representative of the present technology. Rights based on this disclosure have the full scope indicated by the claims.

Figure 1:
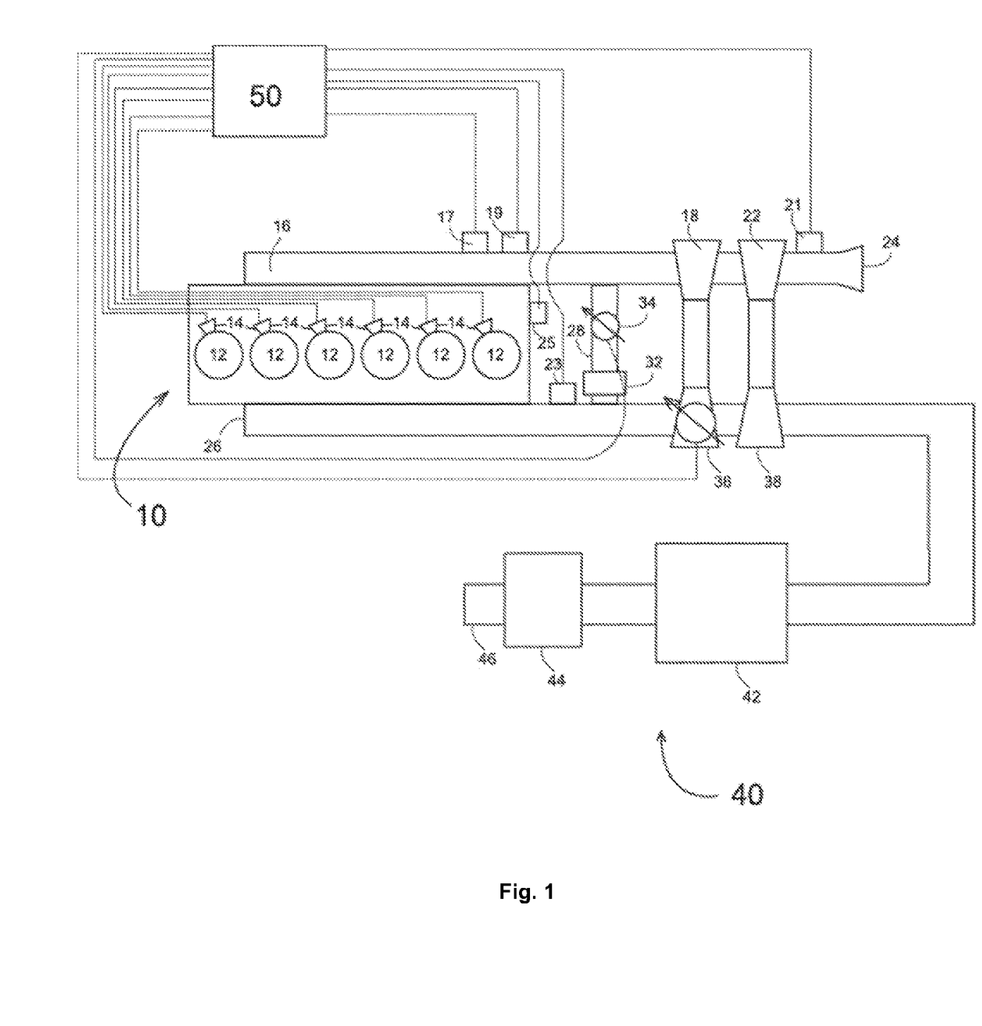
FIG. 1 is a schematic representation of a compression ignition engine with exhaust aftertreatment.

FIG. 1 shows an exemplary schematic depiction of a compression ignition engine 10 and aftertreatment apparatus 40. Operation of the compression ignition engine 10 is monitored and controlled by ECU 50 as described below.

Air enters the engine 10 from air inlet 24. At least one mass air flow sensor 21 senses the amount of air entering the engine through air inlet 24. Air is directed from air inlet 24 to the low pressure turbocharger compressor 22, which compresses the air. Compressed air is then directed from the low pressure turbocharger compressor 22 to the high pressure turbocharger compressor 18, which further compresses the air. Compressed air is then directed to an intake manifold 16. An exhaust gas recirculation system 28 directs exhaust gas from the engine 10 into the compressed air entering the intake manifold 16 to form a mixture of air and exhaust that enters cylinders 12 of the engine 10. An intake mixture temperature sensor 19 and an intake mixture pressure sensor 17 are mounted to the intake manifold 16 to measure the temperature and pressure of the air and exhaust gas mixture entering the cylinders 12 of the engine 10. Fuel injectors 14 are provided to inject fuel into each of the respective cylinders 12.

Exhaust formed by combustion of fuel in the cylinders 12 is directed to an exhaust manifold 26. The exhaust manifold 26 directs exhaust to a connection to the exhaust recirculation system 28 and to a high pressure turbocharger turbine 36. An exhaust oxygen sensor 23 is positioned to measure the amount of oxygen in the exhaust leaving the engine 10.

The exhaust gas recirculation system 28 provides a passage for exhaust leaving the engine to air entering the engine 10. The exhaust recirculation system 28 directs exhaust to an exhaust cooler 32 that lowers the temperature of the exhaust. Exhaust is then directed to a controllable EGR valve 34 and from the valve 34 to the flow of air into the engine 10. The pressure of exhaust from the exhaust manifold 26 is higher than pressure in the intake manifold 16 thereby causing exhaust to flow through the exhaust gas recirculation system 28 from the exhaust manifold 26 through the exhaust gas recirculation system 28 and into the intake manifold 16.

Exhaust that does not flow through the exhaust recirculation system 28 flows to and through the high pressure turbocharger turbine 36. The high pressure turbocharger turbine 36 is driven by exhaust from the engine 10 and drives the high pressure turbocharger compressor 18. The high pressure turbocharger turbine 36 includes a controllable variable nozzle. Opening the controllable variable nozzle decreases driving of the high pressure turbocharger turbine 36 and consequently decreases compression of air by the high pressure turbocharger compressor 18. Opening the variable nozzle of the high pressure turbocharger turbine 36 also decreases resistance of the high pressure turbocharger turbine 36 to the flow of exhaust gas, thereby lowering pressure of exhaust within the exhaust manifold 26 and exhaust gas recirculation system 28. Conversely, closing the variable nozzle of the high pressure turbocharger turbine 36 increases driving of the high pressure turbocharger turbine 36 and increases compression of air by the high pressure turbocharger compressor 18.

Exhaust is directed from the high pressure turbocharger turbine 36 to a low pressure turbocharger turbine 38 that drives the low pressure turbocharger compressor 22. Exhaust is directed from the low pressure turbocharger turbine 38 to the aftertreatment system 40.

The aftertreatment system 40 includes a catalytic converter 42 and a diesel particulate filter 44. Exhaust is directed from the low pressure turbocharger turbine 38 to the catalytic converter 42, and then from the catalytic converter 42 to the diesel particulate filter 44. Exhaust is discharged after passing through the diesel particulate filter 44. Further details of the aftertreatment system 40 can be found in the application entitled "Limiting NOx Emissions" application Ser. No. 13/629,197, filed even date herewith, the disclosure of which is hereby incorporated by reference in its entirety.

The intake mixture pressure sensor 17, intake mixture temperature sensor 19, mass air flow sensor 21, exhaust oxygen sensor 23 and an engine speed sensor 25 are connected to communicate sensor measurements to the engine control unit 50 as indicated in FIG. 1. The ECU 50 controls each of the injectors 14 to control the timing and amount of fuel that is injected into the cylinder 12. The ECU 50 also controls the controllable EGR valve 34 to open and close the valve 34 thereby increasing and decreasing the flow of exhaust gas into the intake manifold 16. The ECU 50 also controls the variable nozzle of the high pressure turbocharger turbine 36 to increase and decrease compression of air by the high pressure turbocharger compressor 18.

Figure 2:
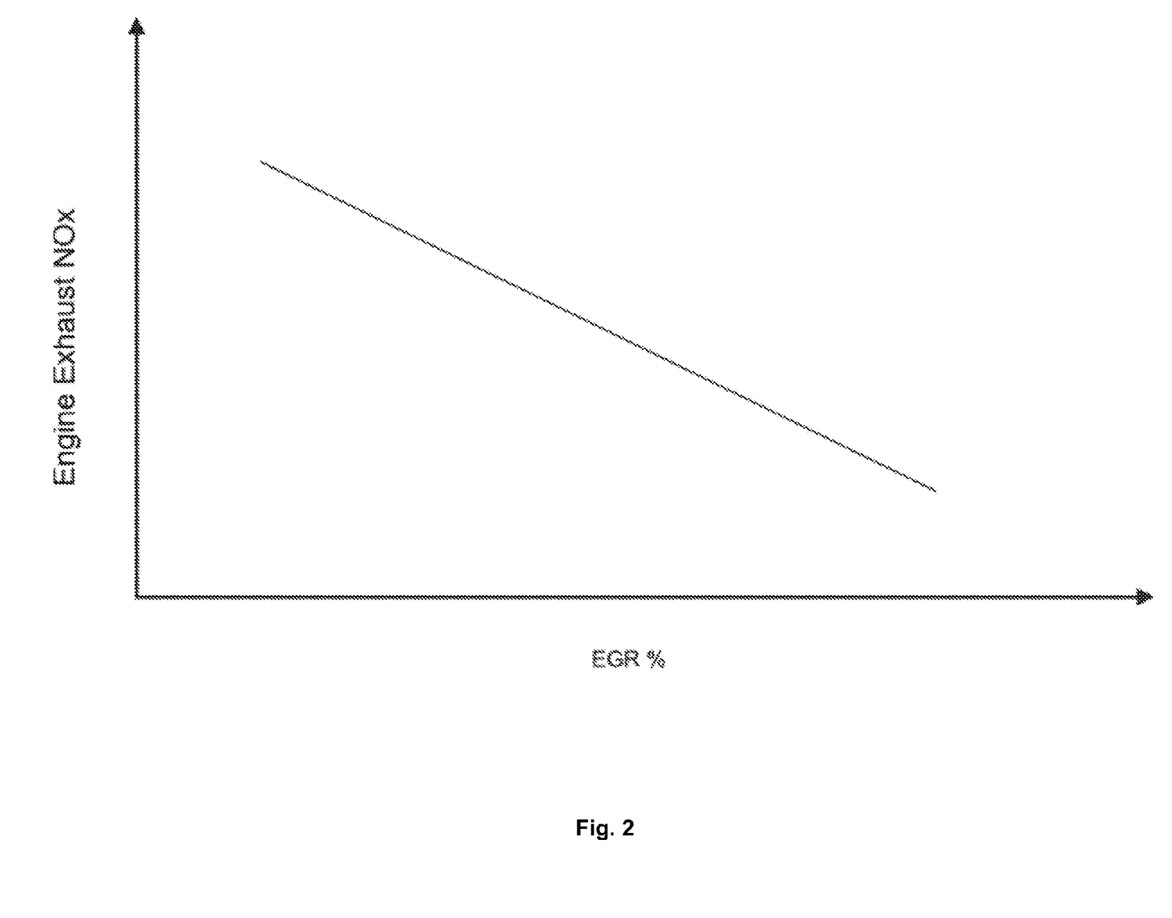
FIG. 2 shows an exemplary relationship between the amount of exhaust gas in the intake mixture and the amount of nitrogen compounds in engine exhaust.

The compression ignition engine 10 includes the exhaust gas recirculation system 28 which can function to inhibit the formation of nitrogen and oxygen compounds during combustion. FIG. 2 is an exemplary depiction of the relationship between the amount of engine exhaust in the intake mixture and the amount of nitrogen and oxygen compounds in an engine's exhaust. Because exhaust gas includes a significant amount of inert diluent, the presence of this diluent reduces the temperature reached as a result of fuel combustion and thereby reduces the creation of nitrogen and oxygen compounds. Providing a sufficient amount of exhaust gas in the intake mixture via one or more methods of the present technology can significantly reduce the amount of such compounds formed by combustion and thereby eliminate the need to remove such compounds from the exhaust by aftertreatment.

One consequence of directing exhaust gas into the intake mixture of an engine is that power created by the engine is reduced because the amount of air that is available for supporting combustion is reduced by the amount of the inert components of the exhaust gas. This is often not a significant disadvantage. For example, an internal combustion engine that powers a vehicle is not required to produce power at or near its capacity for long periods of time such as when the vehicle maintains a constant speed on a surface that offers little resistance to movement of the vehicle.

Fuel economy is also a consideration in the operation of an internal combustion engine. During operation when an engine is not required to produce power at or near its capacity, the amount of fuel provided to the engine can be reduced thereby creating a mixture of air to fuel in which more air is present than is required for combustion of all fuel. Such mixtures are referred to as a "lean" mixture, while mixtures with a greater amount of fuel and consequently a lower air to fuel ratio is referred to as a "rich" mixture.

Combining a lean mixture and exhaust gas recirculation creates an operating condition in which both fuel economy and low emission of nitrogen and oxygen compounds can be achieved as a result of decreased engine power. This is a preferable condition for operation of internal combustion engines, particularly those that power vehicles. However, circumstances can require an engine to produce more power than can be produced from a lean intake mixture that includes a significant amount of inert exhaust gas components. In a vehicle, a common reason for such a demand is to accelerate the vehicle. For acceleration demand, increased power is typically required within a short response period after power is requested of the engine.

Internal combustion engines convert energy from combustion of fuel into mechanical energy. An increase in mechanical power from an internal combustion engine generally requires an increase in the amount of fuel consumed by combustion in the engine. Increasing the amount of fuel provided to a cylinder, such as cylinders 12 of engine 10 shown by FIG. 1, can be accomplished very quickly by fuel injectors, such as fuel injectors 14. For an engine that is operating at a steady state with a lean air to fuel mixture, the amount of fuel consumed by combustion can be quickly increased by providing fuel to create a lower (richer) air/fuel ratio.

Figure 3:
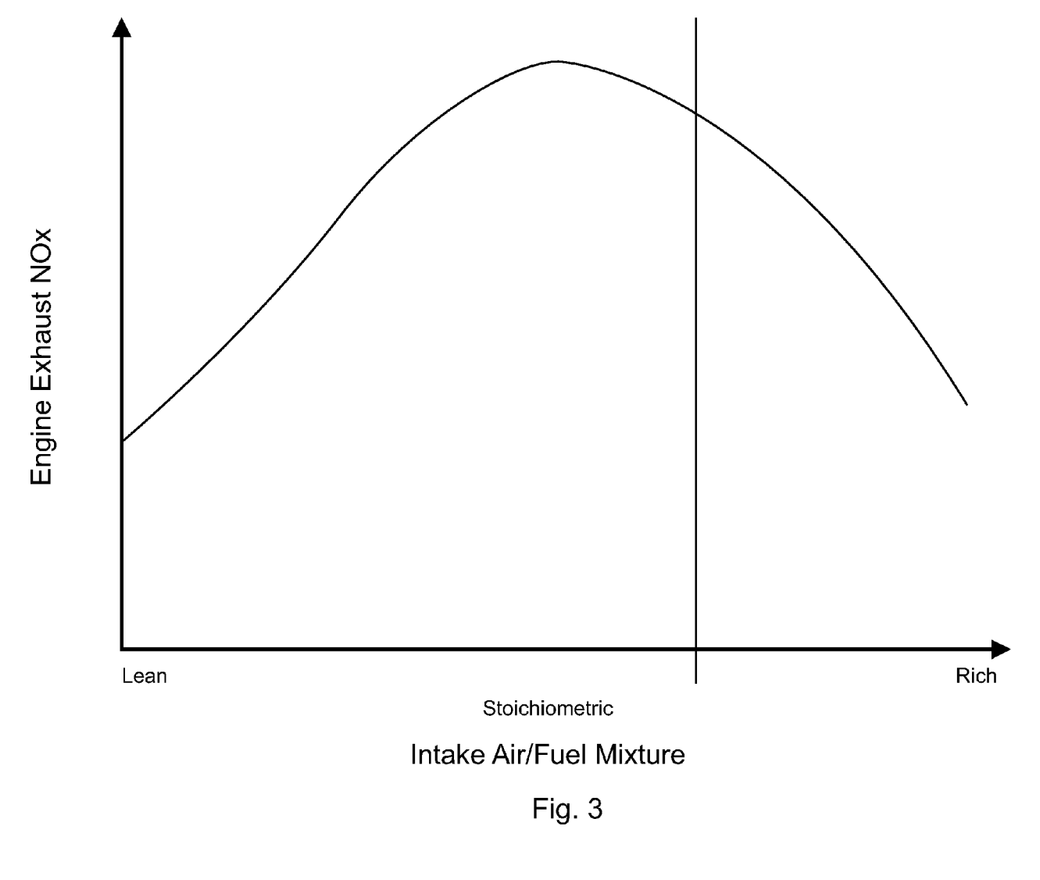
FIG. 3 shows the relationship between the ratio of air to fuel provided to the cylinders for combustion and the amount of nitrogen compounds in engine exhaust.

The creation of compounds of nitrogen and oxygen from combustion of a richer air/fuel ratio by a compression ignition engine is shown in FIG. 3. For an engine that operates at a lean air/fuel mixture, increasing the amount of fuel increases the amount of compounds of nitrogen and oxygen that are created. The amount of oxygen and nitrogen increases as the mixture reaches a mixture at which the effect of increasing bulk combustion temperature is balanced by decreasing availability of oxygen and nitrogen, approximately 10% lean of stoichiometric. However, increasing the amount of fuel so that the mixture is richer than this mixture strength decreases the amount of nitrogen and oxygen compounds created. Therefore, creation of nitrogen and oxygen compounds can be limited for operation of an internal combustion engine when high power is demanded by providing an intake air/fuel mixture that is richer than a mixture that is slightly lean of stoichiometric.

Further increasing the power of an engine can be done by, for example, providing additional air for combustion. Control of air entering the engine is not as direct or as immediate as control of fuel provided from a fuel injector. Referring again to FIG. 1, air is provided to cylinders 12 of the engine 10 by the high pressure turbocharger compressor 18 which received air from the low pressure turbocharger compressor 22. The high pressure turbocharger compressor 18 is driven by the high pressure turbocharger turbine 36. Increasing the amount of air forced to the cylinders 12 by the high pressure turbocharger compressor 18 requires increasing the power produced by the high pressure turbocharger turbine 36. Two controls are available to increase the power produced by the high pressure turbocharger turbine 36. Closing the controllable EGR valve 34 increases the amount of exhaust that is available to drive the high pressure turbocharger turbine 36. Closing the controllable variable nozzle of the high pressure turbocharger turbine 36 increases the pressure of exhaust driving the high pressure turbocharger turbine 36 and increases the power produced by that turbine.

Operating the engine 10 with a richer than stoichiometric air/fuel mixture and without exhaust gas recirculation increases the amount of undesirable nitrogen and oxygen compounds created by the engine 10. For this operating condition, aftertreatment may be required to maintain limited emission of undesirable nitrogen and oxygen compounds. The catalyst 42 is formulated to provide such aftertreatment under this condition by acting when the oxygen content of the exhaust is at a level that results from combustion of a richer than stoichiometric air/fuel ratio. Operating the engine 10 with a richer stoichiometric air/fuel mixture also results in increase soot emissions.

Different fuel injection strategies, including the pattern and timing of fuel injections to an engine's combustion chambers, may be provided depending on the particular operating condition or mode of the engine. For example, one fuel injection strategy may be used with the engine is operating in a "steady state" condition, while a different strategy may be adopted during transient operations where engine power is increasing. By tailoring the fuel injection strategy to the engine operating condition, it is possible to address factors, including fuel economy and pollutant control, while still providing an operator with acceptable vehicle performance.

Figure 4:
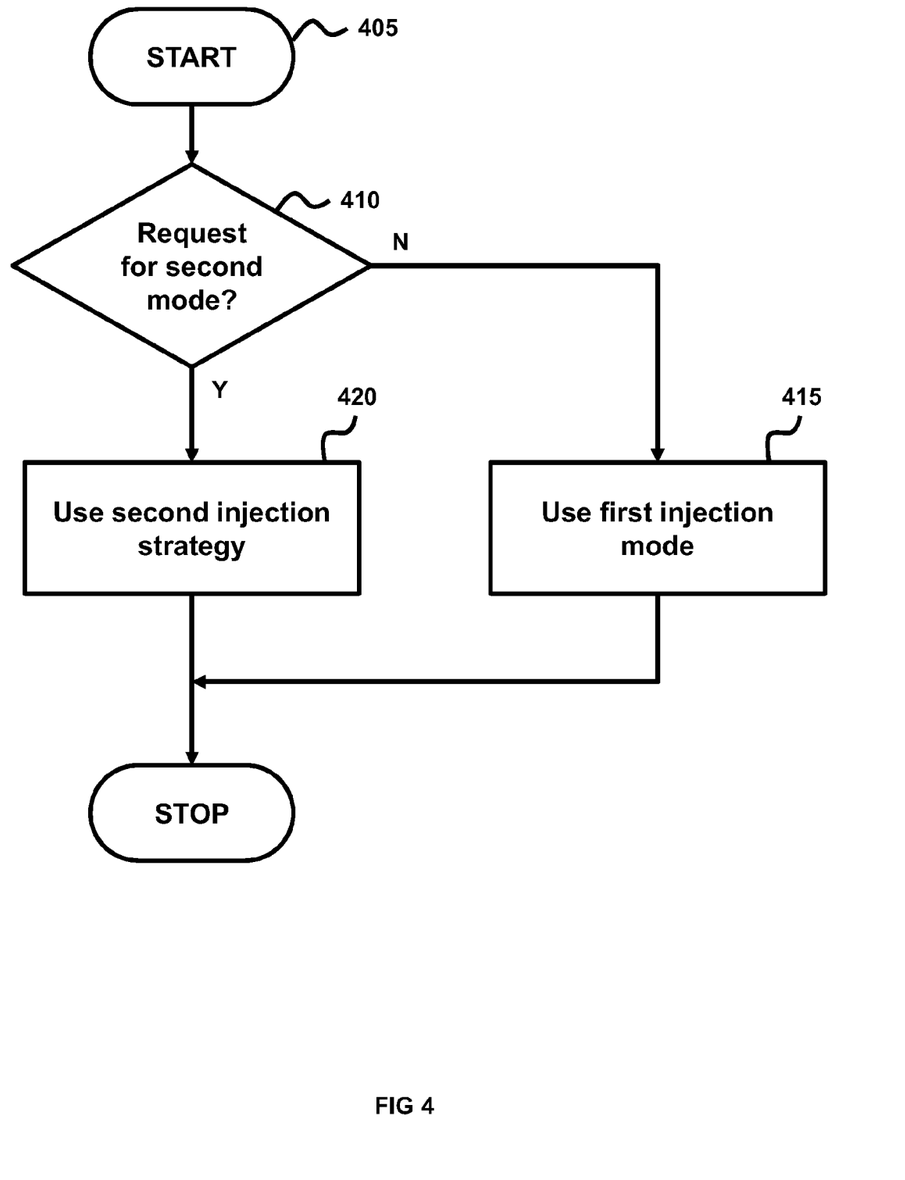
FIG. 4 is a flow chart illustrating at least one embodiment of the present technology and at least one method for switching an engine between first and second fuel injection patterns and timings.

To this end, FIG. 4 illustrates at least one aspect of the present technology as a method 400 for controlling the fuel injection strategy of an engine in response to the engine's operating mode. In one embodiment of this aspect, the method 400 switches the engine between first and second fuel injection strategies depending on the current operating mode of the engine. According to one embodiment, the first fuel injection strategy may be used to operate the engine in a lean combustion mode in which a substantially lean air/fuel condition is provided in a combustion chamber in the engine, while the second fuel injection strategy may be used to operate the engine rich combustion mode in which a substantially rich air/fuel condition is provided in the combustion chamber of the engine. As will be appreciated, the specifics of the substantially rich and substantially lean air/fuel conditions will depend upon one or more parameters including the type of fuel used in the engine. For example, when the engine is diesel fueled, the substantially lean air/fuel condition may have an air/fuel ratio ranging from about 18:1 to about 28:1, and more particularly from about 21:1 to about 25:1, and more particularly about 23:1. Similarly, in the context of a diesel fueled engine, the substantially rich air/fuel condition may utilize an air/fuel ratio ranging from about 12:1 to about 15:1, and more particularly from about 13.8:1 to about 14.3:1, and more particularly about 14.1:1.

The method starts in step 405. Control is then passed to step 410, where the exemplar method of the present technology checks to see if there has been a request to operate the engine in the second operating mode. In some embodiments of the present technology, the request for the second operating mode may be a request for acceleration of the engine, acceleration of the vehicle and/or for increased power output from the engine. A request for acceleration may be detected, for example, based on acceleration pedal position, a change of gear of a vehicle, engine acceleration and/or combinations thereof. Further, engine acceleration may include, for example, at least one of increased engine speed, increased engine torque and/or increased fuel consumption.

If the request for the second operating mode is not detected in step 410, control is passed to step 415 causing a first fuel injection strategy to be used to operate the engine. For example, the first fuel injection strategy may be used to provide a "lean" mixture to the engine, such as during engine operation at constant or slowly changing engine speed under low engine loads. Providing a limited of amount fuel to the engine creates a mixture of air and fuel that contains more air than is required for combustion of the fuel. Such mixtures are referred to as a "lean mixture." In at least one embodiment, the first fuel injection pattern may include at least one pilot injection and at least one main injection. According to at least one embodiment, the pilot injection of the first fuel injection pattern and timing begins when a piston is between about 15 degrees and about −5 degrees before top dead center ("BTDC") of a combustion stroke. Further, according to at least one particular embodiment, the main injection of the first fuel injection pattern may begin when the piston is between about 0 degrees and about −10 degrees BTDC in a combustion stroke. As will be appreciated, the specifics of the fuel injection pattern and timing will depend on the operating mode and the particular combustion characteristics that are to be achieved. Using pilot injection during substantially lean operation can reduce the elapsed time between the introduction of fuel to the combustion chamber and the start of combustion, which reduces combustion noise by limiting the rate of cylinder pressure rise and provides cylinder conditioning to mitigate hydrocarbon emission.

If a request for the second engine operating mode is detected in step 410, control is passed to step 420 causing the engine to be operated using a second fuel injection strategy. For example, where the second operating mode is used to increase engine power output, e.g., during an acceleration event, the second fuel injection strategy may include injecting more fuel into the combustion, while also adjusting pattern and/or timing of the fuel injection to minimize soot emissions during enriched fuel operations. According to a certain aspects of the present technology, the second fuel injection pattern and timing may be a main only injection. According to at least one embodiment, the main injection of the second fuel injection pattern may begin when the piston is between about 15 degrees and about −10 degrees BTDC of a combustion stroke, While the illustrated method includes two fuel injection strategies, it will be appreciated that the present technology is not so limited and can be used to operate an engine using more than two fuel injection strategies. In addition, it will be appreciated that the specifics of the fuel injection strategies, including the pattern and timing of fuel injection events, will depend on a variety of factors including engine type, engine operating mode, fuel type and grade, and other operating conditions. Further, it will be appreciated that the present technology is equally applicable to engines that operate using diesel fuel, natural gas, hydrocarbon fuels, hydrocarbon fuel blends, hydrocarbon and biofuel blends, methane, ethanol, gasoline, biofuel, combinations thereof, and derivatives thereof.

Figure 5:
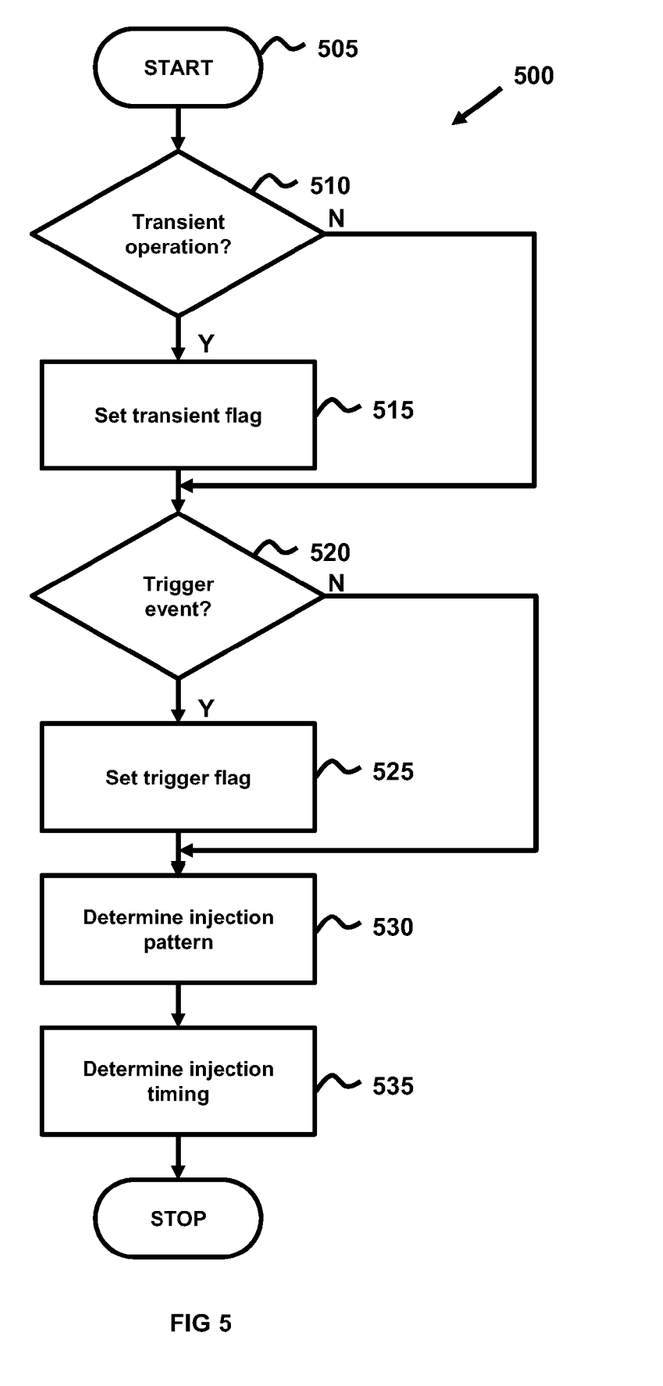
FIG. 5 is a flow chart illustrating another exemplar method for adjusting fuel injection pattern and timing according to at least one embodiment of the present technology.

FIG. 5 illustrates certain aspects of another exemplar method 500 of the present technology. The method 500 can be used to adjust fuel injection timing and/or pattern to reduce particulate emissions, e.g., soot, during transient positive load gradients of an engine, such as a diesel engine. The method 500 begins in step 505. Control is then passed to step 510 where the method 500 determines if the engine is undergoing a transient operation. According to one embodiment, a transient engine operation corresponds to a positive vehicle acceleration and is detected based a rate of change of engine load. Engine load may, for example, be represented as some function of engine speed and torque set point. The method may, for example, monitor engine load over time and detect a transient engine operation when the rate of change in engine load is sufficiently positive. In this regard, transient engine operation may, for example, be detected when the rate of change in engine load exceeds a predetermined load rate threshold ($T_{Torque-Rate}$). In some embodiments, the load rate threshold ($T_{Torque-Rate}$) is about 200 Nm/s and. The method may also check other operating conditions, such as manifold pressure set point versus actual manifold pressure, to further verify that the engine is undergoing transient operation.

If transient operation is detected in step 510, control is passed to step 515, where a transient operation flag is set. Control is then passed to the step 520. Conversely, if transient operation is not detected in step 510, step 515 is bypassed and control is passed directly to step 520.

Figure 6:
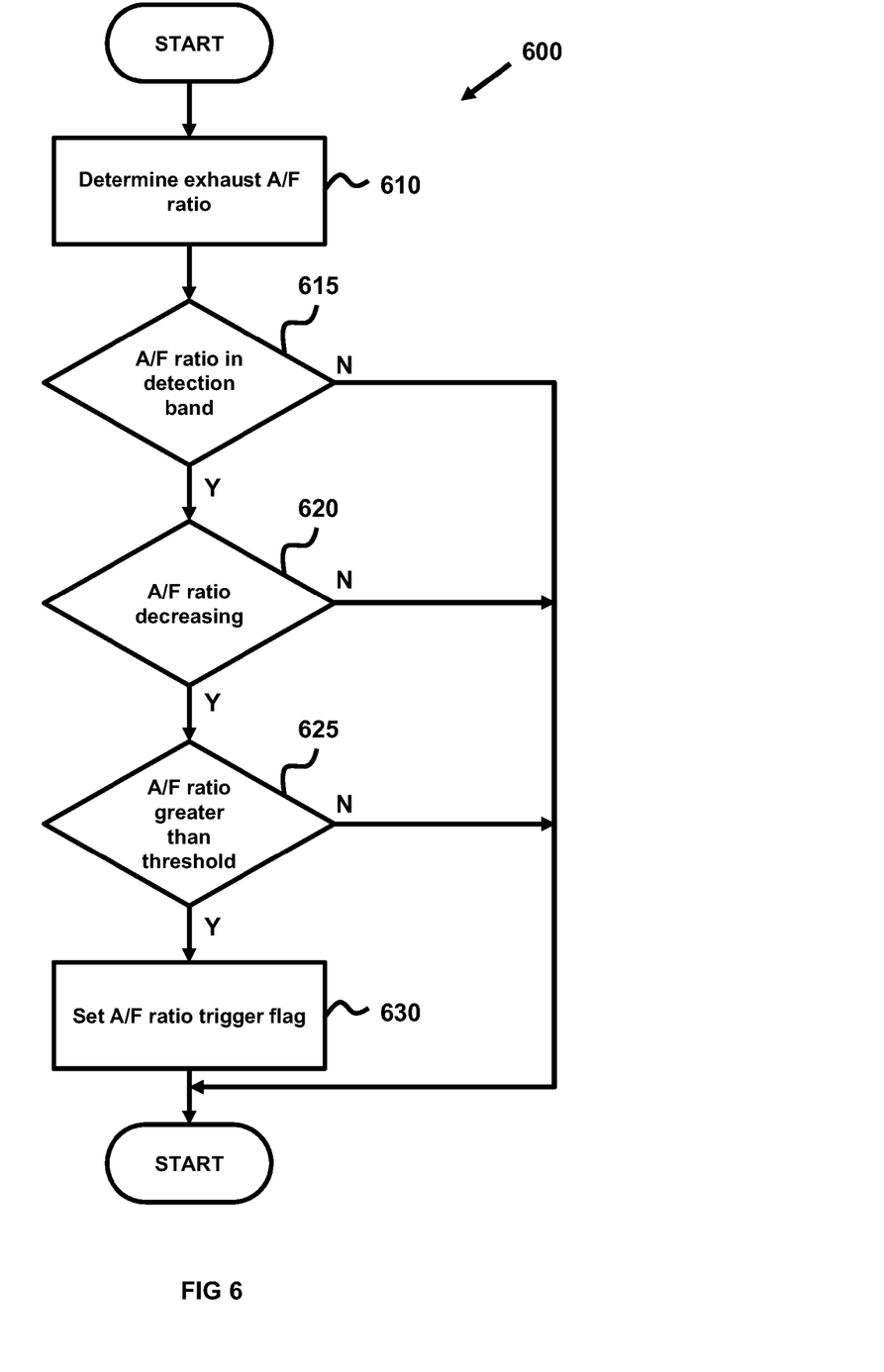
FIG. 6 is a flow chart illustrating a method of detecting a triggering event according to at least one embodiment of the present technology.

In step 520, the method determines if a trigger event is detected. The detection of transient operation by one or more means of checking for load gradient or manifold pressure error causes the trigger event to become true. According to one embodiment, a trigger event may alternatively be detected as a function of the air/fuel ratio of the engine's exhaust. An exemplary method for detecting a trigger event as a function of exhaust air/fuel ratio is illustrated in FIG. 6, which is described in greater detail below.

If a trigger event is detected in step 520, control is passed to step 525 where a trigger flag is set. Control is then passed to step 530. Conversely, if a trigger event is not detected in step 520, step 525 is bypassed and control is passed directly to step 530.

In step 530, the method determines a fuel injection pattern to be used for injecting fuel into the engine cylinders. According to certain embodiments, the fuel injection pattern may include one or more pilot injections, one or more main injections and/or one or more post injections, and/or combinations thereof. The fuel injection pattern may be determined based on what flags are set or not set. For example, according to an embodiment of the present technology, a fuel injection pattern consisting of a pilot injection followed by a main injection is used when the transient and trigger flags are not set. In some embodiments, the injection pattern may also include a post injection when the transient and trigger flags are not set. According to another aspect, an injection pattern that includes only a main injection may be used when the trigger and transient flags are both set. In this regard, the developers of the subject technology have discovered particulate matter emissions, e.g., soot, can be dramatically reduced by utilizing a main-only fuel injection pattern (as opposed to a pattern that also includes pilot and/or post injections) during transient positive load gradients of an engine. The main-only injection pattern can mitigate soot formation by increasing the time between the introduction of fuel to the combustion chamber and the start of combustion. This maximizes the fraction of fuel combusted as a premixed flame, thereby mitigating the mechanism of molecular diffusion as a limiting rate of oxygen availability to the combustion process.

Control is then passed to step 535, where the method 500 determines an injection timing to be used for injecting fuel into the engine cylinders. According to one embodiment, the method determines a base injection timing as a function of engine speed and torque set point, as well as engine operating mode (normal, cold ambient, altitude, etc.) and the prevailing injection pattern. According to certain aspects, an adjusted timing value may be determined (and used for controlling fuel injection to the engine cylinders) when the trigger flag is set, either by detection of transient operation or by sensing exhaust oxygen concentration. As explained in greater detail below, the adjusted timing value may be determined by adjusting (advancing or retarding) the base timing value by a timing offset. If the trigger flag is not set, the base injection value is used to control fuel injection to the engine cylinders.

A variety of methods may be used for determining fuel injection timing in accordance with the present technology. According to one exemplar method of the present technology, a timing offset may be determined as a function of intake manifold and engine pressure. In this regard, actual intake manifold pressure and engine speed may be used to determine the offset value, e.g., via a look-up table. For example, the injection timing for a particular engine speed and intake manifold pressure may be advanced during transient operation to compensate for the higher exhaust manifold pressure that may be encountered during transient operation compared to steady-state operation. According to certain aspects, the offset value is then applied to the base injection timing to arrive at an adjusted engine timing that is used to control fuel injection to the engine cylinders. According to certain aspects, when the current injection pattern (e.g., as determined in step 530) does not include a pilot injection, the offset value is limited to by saturation to minimum and maximum values before it is applied to the base injection timing to arrive at an adjusted timing value. Further, according to certain other aspects, if the current injection pattern includes a pilot injection, the adjustment value is applied to the based injection timing and the resulting adjusted timing is passed through a saturation block. [There is no change in order for pilot and main. The statement is that the pilot injection is similarly offset]

According to another exemplar method of the present technology, a timing offset may be determined as a function of fuel injection quantity and engine speed. According to one aspect of this method, fuel injection quantity and engine speed are used to determine an injection pattern-dependent timing offset, e.g., from a look-up table. For example, for a given injection quantity/engine speed combination, the method may use one timing offset for all injection patterns that feature a pilot injection and another timing offset for all patterns that do not feature a pilot injection. Accordingly, the method may determine the timing offset as a function of engine speed and fuel injection quantity and further as a function of injection pattern. The timing offset is then applied to the base injection timing to arrive at an adjusted injection timing that is used to control fuel injection into the engine cylinders. According to certain aspects of this method, the injection timing offset may be limited by saturation to minimum and maximum values before it is used to control the engine.

According to still another exemplar method of the present technology, fuel injection timing may be based on combustion modeling. According to certain aspects, model-based injection timing correction models the ignition delay during transient operation as dependent on an exponential function of the ratios of intake manifold pressure and intake manifold oxygen concentration during transient operation to those during steady state operation at the prevailing engine speed and injection quantity. The image of this function is a scalar, which is applied as a factor to the steady-state ignition delay in order to predict the transient ignition delay. The predicted transient ignition delay is used to correct the injection timing in order to maintain the crank angle of 50% mass burned fraction during transient operation equal to that which would be encountered during steady-state operation at the prevailing engine speed and injection quantity. The corrected injection timing is subtracted from the current injection timing, limited in a saturation block, and output for downstream addition to the current injection timing.

FIG. 6 illustrates an exemplar method 600 for detecting a trigger event as a function of engine exhaust air/fuel ratio. Initially, in step 610, the method determines the air/fuel ratio of the engine's exhaust. For example, the exhaust air/fuel ratio may be determined by measurement of the exhaust oxygen concentration using a universal exhaust gas oxygen sensor, for example.

Control is then passed to step 615 where the method 600 compares the exhaust air/fuel ratio to a detection band defined by upper and lower thresholds ($T_{A/F\_Upper}$; $T_{A/F\_Lower}$). In some embodiments the upper air/fuel ratio threshold ($T_{A/F\_Upper}$) may be between about 14.7 and about 15.1, and more particularly between about 14.8 and about 15, and more particularly about 14.9. Similarly, in some embodiments the lower air/fuel ratio threshold ($T_{A/F\_Upper}$) may be between about 11 and about 13, and more particularly between about 11.5 and about 12.5, and more particularly about 12.

If the exhaust air/fuel ratio is within the detection band, control is passed to step 620, where the exhaust air/fuel ratio and the method determine if the exhaust air/fuel ratio is decreasing over time. The exhaust air-fuel ratio gradient can be used as a redundant entry condition to step 625, to ensure that the mixture is indeed becoming richer at the time the trigger is scheduled to be set. If the exhaust A/F ratio is decreasing, control is passed to step 625.

In step 625, the exhaust air/fuel ratio is compared to an air/fuel ratio set threshold $T_{A/F\_Set}$, which is between the upper and lower threshold ($T_{A/F\_Upper}$; $T_{A/F\_Lower}$). The intermediate threshold can be used to determine the point at which the injection pattern and timing should be switched to the second arrangement. If it is, control is passed to step 630, where A/F ratio trigger flag is set. According to certain embodiments, the A/F ratio trigger flag is only reset when the exhaust air/fuel ratio subsequently crosses (exceeds) the upper threshold $T_{A/F\_Upper}$, in order to provide a hysteresis band to inhibit rapid switching between the first and second injection pattern arrangements in response to minute oscillation of the sensed air-fuel ratio about the set threshold. Further, as can be seen, if any of the conditions checked in steps 615, 620 or 625 is not met, step 630 is bypassed and the air/fuel ratio does not get set.

FIGS. 7-10 are graphs demonstrating exemplary improvements in particulate matter emissions that can be achieved by changing injection pattern and/or timing while operating an engine at or near stoichiometric air/fuel ratios according to certain aspects of the present technology.

Figure 7:
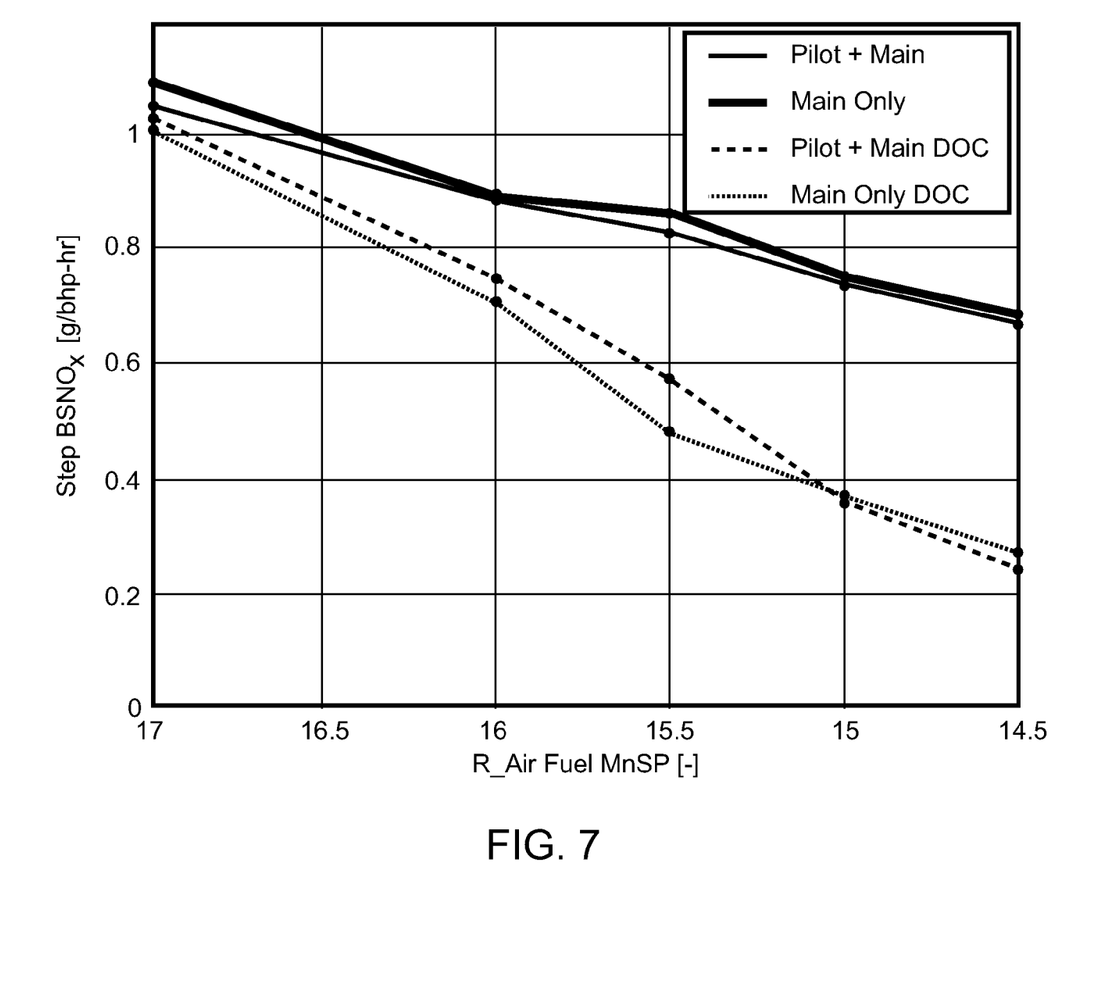
FIGS. 7-10 are graphs demonstrating exemplary improvements in particulate matter emissions that can be achieved by changing injection pattern and/or timing while operating an engine at or near stoichiometric air/fuel ratios according to certain aspects of the present technology.

In the graph of FIG. 7, each data point represents one "step response" test in which the engine was asked to go from zero torque to its maximum torque as quickly as possible at constant speed. The X-axis is the air/fuel ratio tuned into the smoke limiter during the test, while the Y-axis is the grams of NOx produced during the maneuver divided by the work produced during the maneuver. The upper set of lines are the NOx output from the engine ("engine out NOx"), while the lower set of lines are the NOx output at the tailpipe ("tailpipe NOx"), i.e., NOx output downstream of the aftertreatment system. As can be seen from this graph (FIG. 7), changing the injection pattern from the standard injection (i.e., pilot+main) to the main only injection has little impact on tailpipe and engine out NOx.

Figure 8:
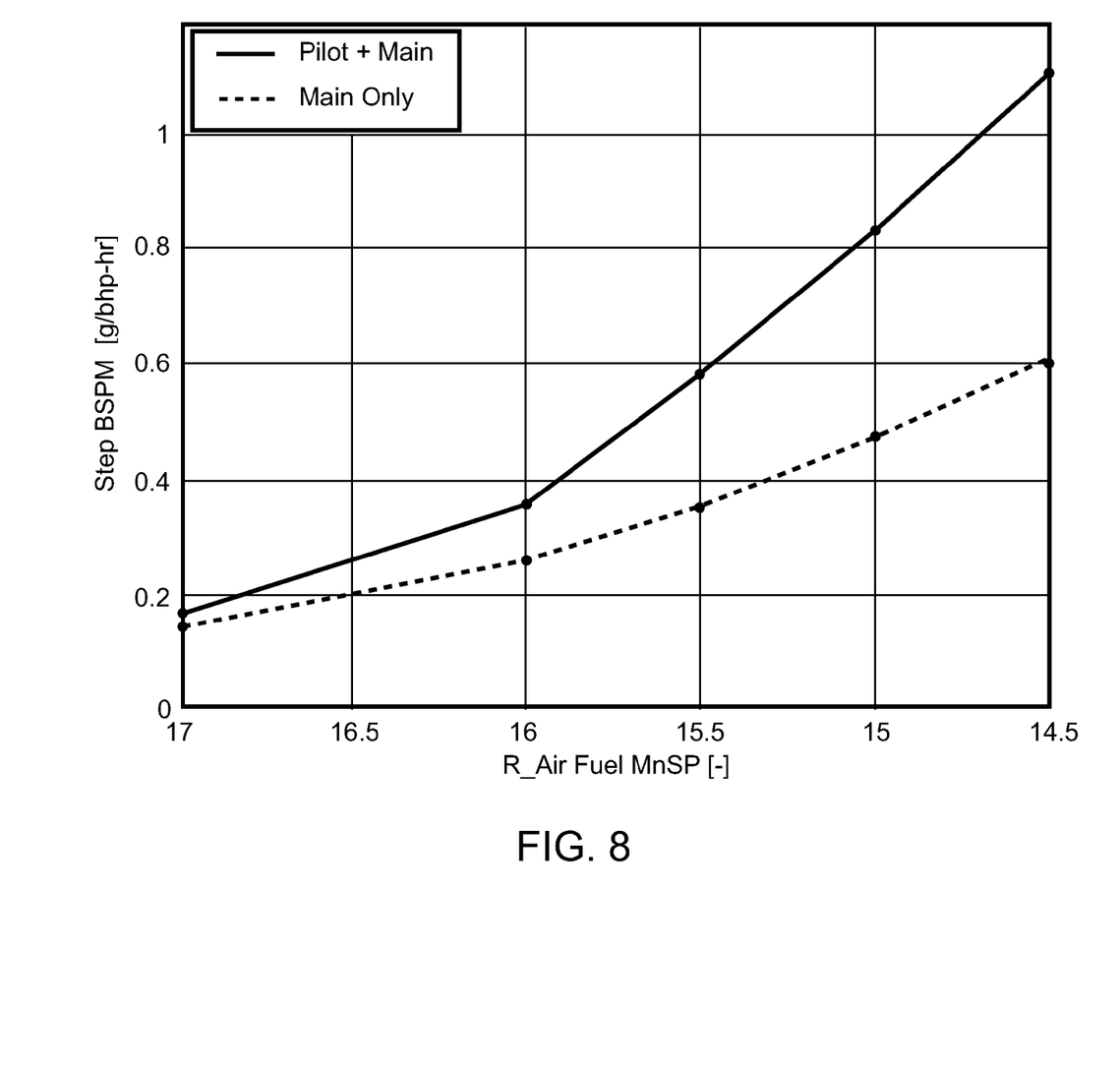

FIG. 8 is a graph showing particulate matter output during the same step response test as shown in FIG. 7. Specifically, in FIG. 8, as with FIG. 7, each data point in this graph represents one "step response" test in which the engine was asked to go from zero torque to its maximum torque as quickly as possible at constant speed. The X-axis is the air/fuel ratio tuned into the smoke limiter during the test, while the Y-axis is the grams of PM produced during the maneuver divided by the work produced during the maneuver. Both of the lines on the graph are for the particulate matter output by the engine ("engine out PM"). In FIG. 8, the standard injection (i.e., pilot+main) is shown in the solid line, while the main only injection is shown in the dotted line. As this graph (FIG. 8) demonstrates, changing the injection pattern from the standard (i.e., pilot+main) injection to a main only injection significantly reduces the PM generated over the step response during each of the step responses.

Figure 9:
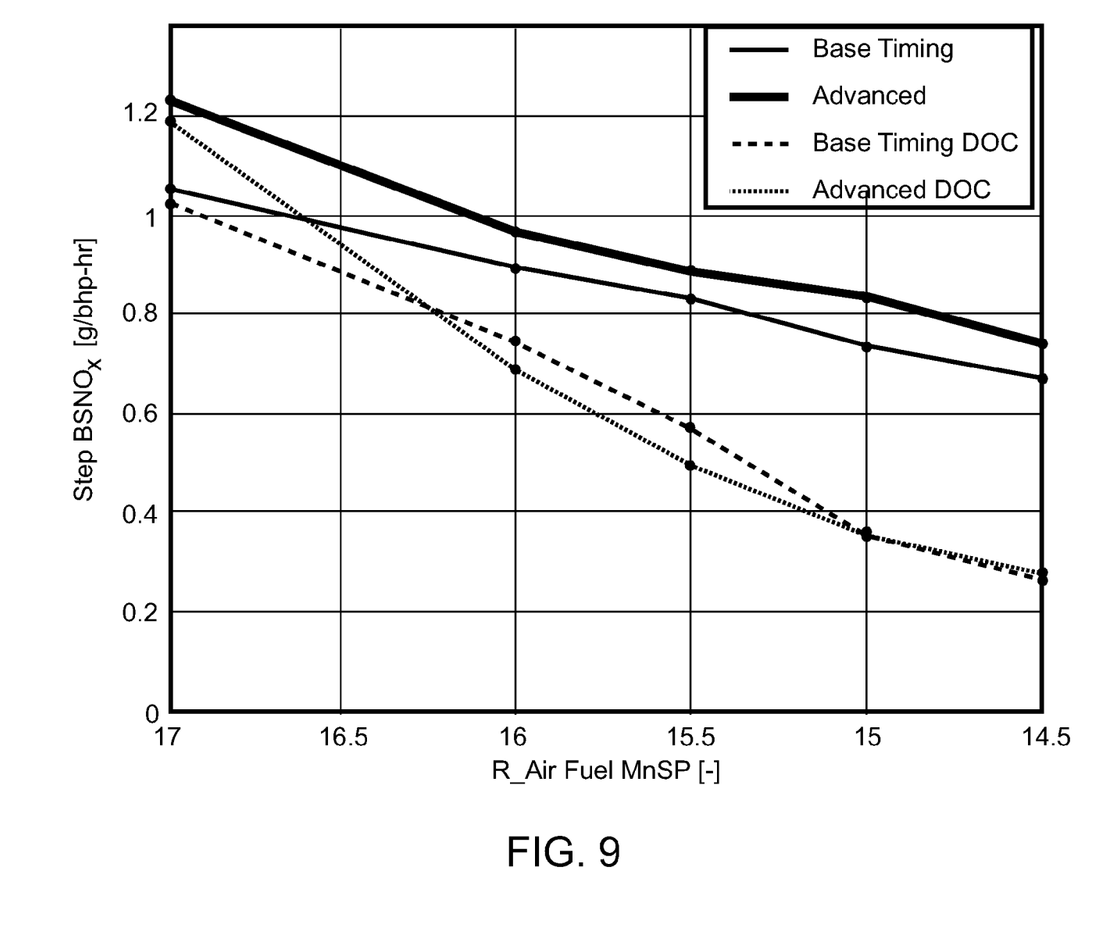

In FIG. 9, as above, each data point represents one "step response" test in which the engine was asked to go from zero torque to its maximum torque as quickly as possible at constant speed. The X-axis is the air/fuel ratio tuned into the smoke limiter during the test, while Y-axis is the grams of NOx produced during the maneuver divided by the work produced during the maneuver. The upper (solid) lines are the NOx output from the engine ("engine out NOx"), while the lower (dashed) lines are the NOx output at the tailpipe ("tailpipe NOx"), that is NOx output downstream of the aftertreatment system. In each instance, the standard injection pattern (i.e., pilot+main) was used. As with FIG. 7, this graph (FIG. 9) demonstrates that NOx generated from the maneuver is significantly reduced across the DOC (aftertreatment system) and that the reduction is most significant when the air/fuel ratio is stoichiometric. FIG. 9 also demonstrates that any increase in engine out NOx due to timing (compare upper solid lines) goes away after the DOC (compare lower dashed lines, in the neighborhood of 15:1 Air/fuel ratio).

Figure 10:
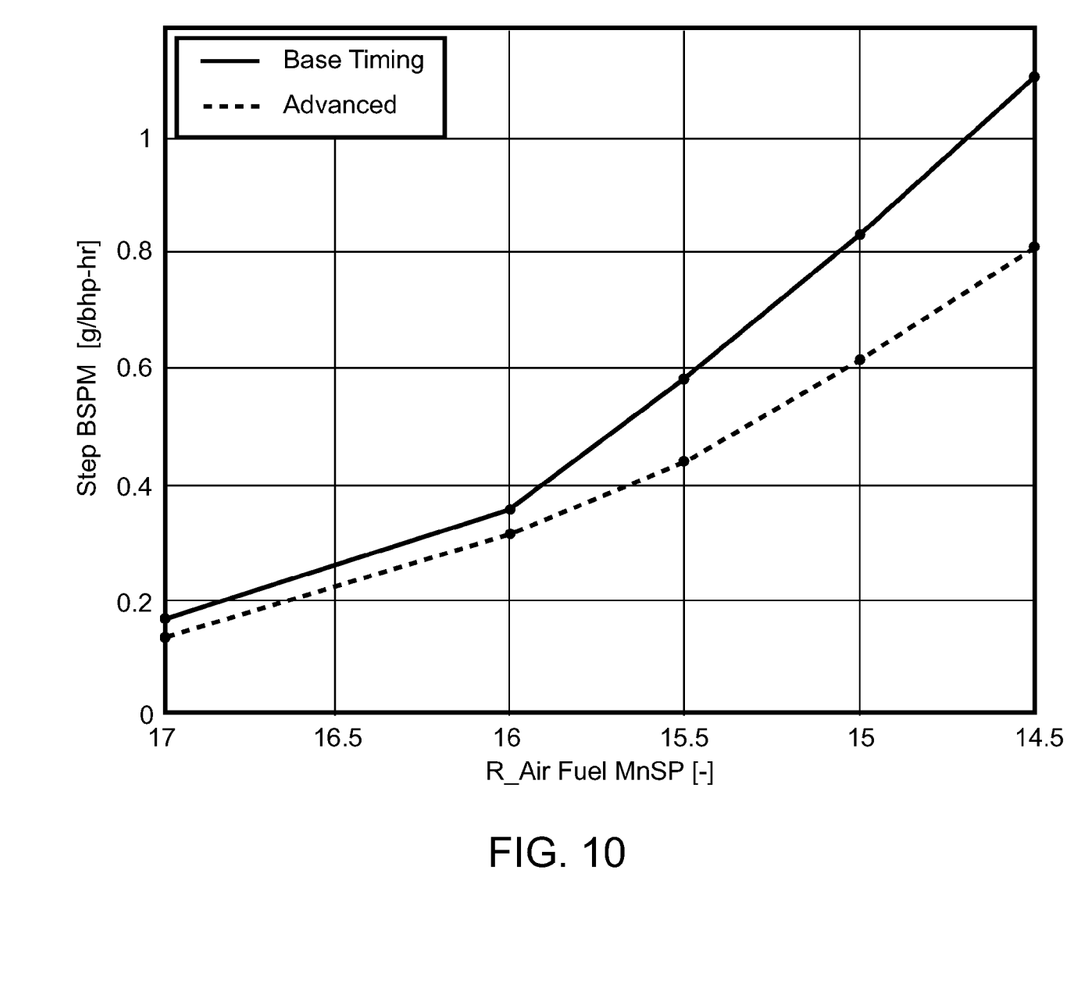

FIG. 10 is a graph showing particulate matter output during the same step response test as shown in FIG. 9. In the graph of FIG. 10, as above, each data point represents one "step response" test in which the engine was asked to go from zero torque to its maximum torque as quickly as possible at constant speed. The X-axis is the air/fuel ratio tuned into the smoke limiter during the test, while the Y-axis is the grams of PM produced during the maneuver normalized by the work produced during the maneuver. In each case, the standard injection pattern (i.e., pilot+main) was used. The base injection timing (with standard injection pattern) is shown in the solid line, while the advanced injection timing (with standard injection pattern) is shown in the dotted line. This graph (FIG. 10) demonstrates that changing the injection timing reduces the PM generated over the step response. Taken together with FIG. 9, these two graphs show that there is no significant NOx impact at the tailpipe due to modifying timing (see FIG. 9), but there is a significant PM reduction due to modifying timing (see FIG. 10). This is an example of a "modified tradeoff." Normally timing changes that decrease PM (as seen in FIG. 10) should increase NOx. However, FIG. 9 demonstrates that this is not the case, at least at the tailpipe (indicated by lower set of curves in FIG. 10).

The invention claimed is:

1. A method of operating an engine to limit soot emissions during fuel enriched operation, comprising:
    operating the engine in an first mode with a substantially lean air to fuel ratio using a first fuel injection pattern having a pilot injection a main injection;
    receiving a request for an increased engine power output; and
    operating the engine in a second mode with a substantially homogenous or rich air to fuel ratio in response to the request for the increased power output, and when the engine is operating in the second mode using a second fuel injection pattern having a main injection and no pilot injection.

2. The method of claim 1, wherein the engine comprises a piston movable in a combustion chamber, and wherein the pilot injection begins when the piston is between about 15 degrees and about −5 degrees before top dead center of a combustion stroke.

3. The method of claim 1, wherein the engine comprises a piston movable in a combustion chamber, and wherein the main injection begins when the piston is between about 0 degrees and about −10 degrees before top dead center of a combustion stroke.

4. The method of claim 1, wherein the engine comprises a piston movable in a combustion chamber, and wherein the main injection of the second fuel injection pattern begins when the piston is between about 15 degrees and about −10 degrees before top dead center of a combustion stroke.

5. The method of claim 1, wherein the engine uses one or more of diesel fuel, natural gas, hydrocarbon fuels, hydrocarbon fuel blends, hydrocarbon and biofuel blends, methane, ethanol, gasoline, biofuel, combinations thereof, and derivatives thereof.

6. A method of operating an engine to reduce soot emissions during fuel enriched operation, comprising:
    operating the engine at a first power output by providing a substantially lean air/fuel condition in a combustion chamber of the engine, wherein providing the substantially lean air/fuel condition comprises injecting fuel into the combustion chamber using a first fuel injection pattern and timing that is selected to reduce NOx emissions during lean air/fuel conditions, and which comprises a pilot injection and a main injection;
    receiving a request for a second power output from the engine, where the second power output is greater than the first power output; and
    providing a substantially enriched air/fuel condition in the combustion chamber of the engine relative to the lean air/fuel condition to transition the engine to the second power output, wherein providing the substantially enriched air/fuel condition comprises injecting fuel into the combustion chamber using a second fuel injection pattern and timing that is selected to reduce soot emissions during the enriched air/fuel condition, and which comprises a pilot injection without a main injection.

7. The method of claim 6, wherein the second fuel injection pattern and timing is selected to maintain soot emissions at or below 0.35 grams per brake horsepower hour during the enriched air/fuel condition.

8. The method of claim 7, wherein the first fuel injection pattern and timing is selected to maintain NOx emissions to less than 0.02 grams per brake horse power hour.

9. The method of claim 7, wherein an engine is a diesel fueled engine and the substantially enriched air/fuel condition has an air/fuel ratio ranging from about 12:1 to about 15:1.

10. The method of claim 9, wherein the substantially enriched air/fuel condition has an air/fuel ratio ranging from about 13:8 to about 14:5.

11. The method of claim 10, wherein the substantially enriched air/fuel condition has an air/fuel ratio of about 14:1.

12. The method of claim 11, wherein the engine is a diesel fueled engine and the substantially lean air/fuel condition has an air/fuel ratio ranging from about 18:1 to about 28:1.

13. The method of claim 6, wherein the quantity of fuel injected during the pilot injection is less than the quantity of fuel injected during the main injection.

14. The method of claim 6, wherein the pilot injection begins when the piston is between about 15 degrees and about −5 degrees before top dead center of a combustion stroke.

15. The method of claim 6, wherein the main injection of the first fuel injection pattern begins when the piston is between about 0 degrees and about −10 degrees before top dead center of a combustion stroke.

16. A method of operating a compression ignition engine to reduce soot during fuel enriched operation to increase engine power, the engine having a piston movable in a combustion chamber, the method comprising:

operating the engine at a first power output by providing a substantially lean air/fuel condition in the combustion chamber of the engine, wherein the substantially lean air/fuel condition has an air/fuel ratio ranging from about 18:1 to about 28:1, and wherein providing the substantially lean air/fuel condition comprises injecting fuel into the combustion chamber using a first fuel injection pattern that comprises at least one pilot injection occurring when the piston is between 15 degrees and −5 degrees before top dead center of a combustion stroke and at least one main injection occurring when the piston is between 0 degrees and −10 degrees before top dead center of the combustion stroke;

receiving a request for a second power output from the engine, where the second power output is greater than the first power output;

providing a substantially enriched air/fuel condition in the combustion chamber of the engine until the engine approaches the second power output, wherein the substantially enriched air/fuel condition has an air/fuel ratio ranging from about 12:1 to about 15:1, and wherein providing the substantially enriched air/fuel condition comprises injecting fuel into the combustion chamber using a second fuel injection pattern that is a main only injection occurring when the piston is between 15 degrees and −10 degrees before top dead center of the combustion stroke.

* * * * *